United States Patent
Binot et al.

(10) Patent No.: US 7,001,525 B2
(45) Date of Patent: Feb. 21, 2006

(54) METHOD FOR THE TREATMENT OF WATER BY BALLASTED FLOCCULATION AND GRAVITY SEPARATION WITH VARIABLE FUNCTION MODES

(75) Inventors: Patrick Binot, Rentilly Par Bussy (FR); Valery Ursel, Saint Maurice (FR)

(73) Assignee: OTV SA, (FR)

( * ) Notice: Subject to any disclaimer, the term of this patent is extended or adjusted under 35 U.S.C. 154(b) by 0 days.

(21) Appl. No.: 10/471,848

(22) PCT Filed: Mar. 14, 2002

(86) PCT No.: PCT/FR02/00920

§ 371 (c)(1),
(2), (4) Date: Mar. 31, 2004

(87) PCT Pub. No.: WO02/074691

PCT Pub. Date: Sep. 26, 2002

(65) Prior Publication Data

US 2004/0144730 A1 Jul. 29, 2004

(30) Foreign Application Priority Data

Mar. 15, 2001 (FR) .................................. 01 03567

(51) Int. Cl.
C02F 1/52 (2006.01)
(52) U.S. Cl. .................. 210/709; 210/711; 210/713; 210/714; 210/727; 210/738
(58) Field of Classification Search ................ 210/709, 210/711, 713, 714, 724, 725, 727, 738, 787
See application file for complete search history.

(56) References Cited

U.S. PATENT DOCUMENTS

| 2,087,851 | A | 7/1937 | Darby |
| 2,110,721 | A | 8/1938 | Fischer |
| 4,388,195 | A | 6/1983 | von Hagel et al. ......... 210/709 |
| 5,643,443 | A | 7/1997 | Ishikura ..................... 210/113 |
| 6,383,370 | B1 * | 5/2002 | Keever et al. ............. 210/96.1 |
| 6,485,652 | B1 * | 11/2002 | Le Poder et al. ........... 210/713 |
| 6,824,692 | B1 * | 11/2004 | Binot et al. ................. 210/709 |

FOREIGN PATENT DOCUMENTS

| EP | 0 150 646 | 8/1984 |
| EP | 0 680 933 | 8/1995 |

(Continued)

*Primary Examiner*—Peter A. Hruskoci
(74) *Attorney, Agent, or Firm*—Coats & Bennett, P.L.L.C.

(57) ABSTRACT

The invention relates to a method for treatment of water, permitting the physico-chemical treatment of water, including a ballasted flocculation stage using a granular ballast material with a density greater than water, followed by, a stage of gravity separation of the treated water and the flocculent mass, a stage of separation of the granular material, recycled for the flocculation stage and the muds. Said muds are sent to a stage for treatment of the muds, characterised in comprising a stage in which the functional mode passes from a mode using ballasted flocculation and gravity separation using coagulation and flocculation reagents to a mode functioning by simple gravity separation, without using coagulation and flocculation reagents. The passage from one mode to another is determined using at least one item of information on the water obtained at any stage of the treatment thereof or before said treatment.

7 Claims, 2 Drawing Sheets

FOREIGN PATENT DOCUMENTS

Figure 1A:
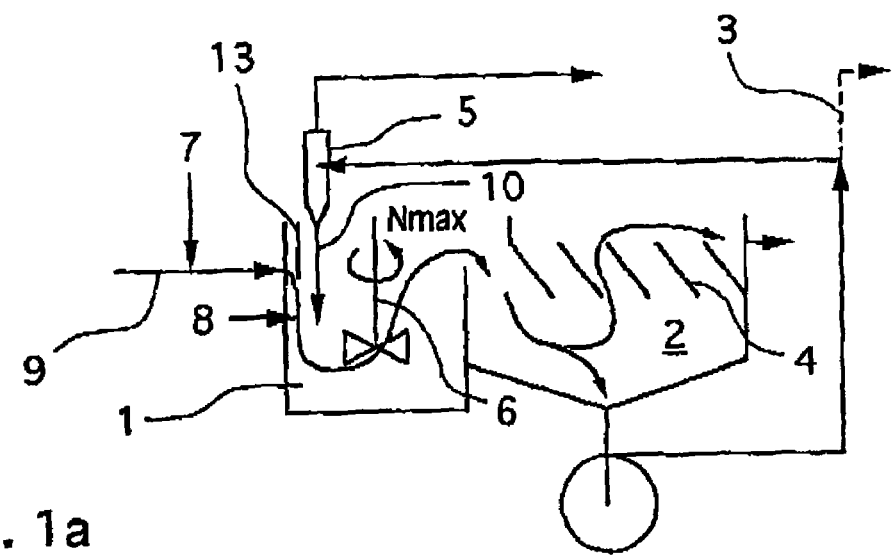

| | | |
|---|---|---|
| EP | 0 767 143 | 4/1996 |
| FR | 803 026 | 9/1936 |
| FR | 2 146 533 | 2/1973 |
| FR | 2 627 704 | 9/1988 |
| WO | WO97/35655 | 10/1997 |
| WO | WO99/19261 | 4/1999 |

* cited by examiner

METHOD FOR THE TREATMENT OF WATER BY BALLASTED FLOCCULATION AND GRAVITY SEPARATION WITH VARIABLE FUNCTION MODES

This application is a U.S. National Stage application of PCT Application No. PCT/FR02/00920, with an international filing date of Mar. 14, 2002. Applicant claims priority based on French application serial no. 01 03567 filed Mar. 15, 2001.

Various treatment techniques are known in water treatment, using gravity as the means of separation between a solid phase and a liquid phase.

In particular, known techniques include simple settlement techniques with or without lamellas designed to increase the settlement surface area, in which settlable solids arriving in a raw water flow are separated from water treated by settlement without the use of a chemical reagent, at Hazen settlement velocities (treated flow divided by the simple settlement surface area or by the surface area of lamellas, if any, projected onto a horizontal plane) of the order of 1 to 2 meters per hour.

This type of settlement is a means of separating settlable solids in suspension in raw water. This technique is not capable of separating colloidal solids from water. It is economic in operation because it does not use any chemical reagents, but it does require large settlement surface areas due to the low possible Hazen velocities, as soon as the peak flow to be treated is high, for example in rainy weather for the treatment of waste water from unit networks.

This technique is frequently used for primary treatment of waste water, before biological treatment, for example by biofiltres.

There are also techniques called settlement flocculation techniques in which a coagulant reagent, usually composed of a salt of iron or aluminium and/or a cationic polymer, is added to the raw water to destabilise the colloids, and a flocculent reagent, usually composed of an organic polymer, is then added into a flocculation basin with coagulated water to form dense flocs that are separated from the treated water in a simple or lamellar settlement zone similar to the previous zone.

The residence time in the stirred flocculation basin is of the order of 10 to 30 minutes, and the Hazen settlement velocities are usually of the order of 1 to 3 meters per hour.

This technique has the advantage that it makes colloidal settlable solids, and can therefore improve the efficiency of depollution compared with simple settlement.

It has the disadvantage that it consumes reagents and requires large settlement areas to process waste water treatment peaks such as in rainy weather.

Finally, there is a very fast settlement technique called ballasted flocculation using a granular ballast such as fine sand, which enables settlement velocities of 50 to 200 meters per hour.

This technique, for example described in patents FR2719234 and FR2627704 deposited by the Applicant, requires the use of a coagulant reagent on the upstream side of the installation to destabilise colloids and combine them into micro-flocs, followed by the addition of a flocculent reagent and granular ballast, to form high-density flocs from coagulated micro-flocs.

The flocculent reagent and the granular ballast that may be micro-sand or any granular material with a density greater than the density of the fluid to be treated, are added into a stirred injection zone, followed by a "maturing" zone, that is intended to avoid direct departures of sand, reagent or unflocculated water to the settlement zone following the maturing zone. In ballasted flocculation of granular material, the various injection and maturing zones as a whole are usually called the "flocculation zone".

In the simplest version, the injection and maturing zones are located in the same stirred basin, the hydraulics of the basin being such that it minimises the direct departure of granular material, reagents and unflocculated water to the settlement zone, for example by injecting sand and flocculation polymer on the hydraulic side on the upstream side of the flocculation basin, the downstream part of which acts as a maturing zone.

In one preferred version, the injection and maturing zones are materialised by different and successive basins starting with the injection basin, followed by the maturing basin. The hydraulic residence times are typically of the order of one minute in the injection basin and 2 to 6 minutes in the maturing basin.

This technique has the advantage firstly that it makes the colloidal part of pollution to be treated settlable, and it also minimises settlement areas necessary for the treatment of high flows such as storm flows. Unfortunately, this technique has the disadvantage that it continuously consumes chemical reagents even when the pollution contents to be treated, for example in dry weather, no longer justify treatment of colloidal pollution; although it is possible to significantly reduce the injection of chemical reagents, particularly coagulant, completely stopping the injection of chemical reagents causes ballast losses that are preferable to avoid; the settlement velocities of the smallest sand grains, which are no longer trapped in the physicochemical flocs, are lower than the settlement velocities of large diameter physicochemical flocs that trap several grains of sand, obtained when the reagent is injected.

It is also possible to have flocculation similar to ballasted flocculation of the granular material by circulating some of the decanted sludge in the settlement zone to the flocculation zone. This technique enables stable operation at high settlement velocities when chemical reagents are injected into the system, and during periods in which chemical treatment is not necessary, for example during dry weather with low flow, injection of chemicals can be stopped to work in simple settlement without consuming any reagent.

However, this technique has the disadvantage that settlement velocities cannot be as high as with ballasted settlement with a granular material, and it requires a non-negligible stabilisation time, frequently incompatible with sudden arrival of rain or peak flows.

The purpose of this invention is to propose a method and unit for the treatment of water by flocculation/gravity separation capable of solving these problems according to the state of the art.

This purpose is achieved according to the invention that relates to a water treatment method for the physicochemical treatment of water including a ballasted flocculation step of a granular ballasting material denser than water, followed by a step for gravity separation of the treated water and flocs, a step for separation of the granular material recycled in the flocculation step and sludges, the said sludges being sent to a sludge treatment step, characterised in that it comprises a step that consists of changing from a ballasted flocculation—gravity separation mode using coagulation and flocculation reagents, to a mode operating by simple gravity separation without the use of coagulation and flocculation reagents, the changeover from one operating mode to another being determined based on at least one item of information related to the water at any step in its treatment or before its treatment.

It will be noted that the granular material may or may not be chemically inert. It may be composed of sand or micro-sand, or garnet, basalt, iron oxides, magnetite, etc.

Preferably, the said granular ballasting material is micro-sand with an effective diameter of between 30 and 200 micrometers, and the said gravity separation step is a settlement step.

In one other possible embodiment, the granular material is micro-sand with an effective diameter of between 30 and 200 micrometers, and the said gravity separation step is a centrifuging step, for example by a cycloning or vortex effect.

Advantageously, the method according to the invention also comprises an intermediate operating mode without any granular ballasting material, but with the use of at least one chemical coagulation—flocculation reagent.

Preferably, the said at least one item of information about the water used to decide which operating mode should be used will be chosen from among the water flow to be treated, turbidity of the water to be treated, turbidity of the treated water, Chemical Oxygen Demand (COD) of the water to be treated, Total Organic Carbon (T.O.C.), and resistivity.

According to one preferred aspect of the invention, the low speeds of the stirrers used to avoid bringing granular ballast material back into suspension in the flocculation step is between 2.5 and 20 centimetres per second, and preferably between 5 and 10 centimetres per second.

Preferably the said step consisting of changing from one operating mode to another is automatic.

The invention also relates to any installation specially designed for implementation of such a method, including upstream means for injecting at least one coagulant reagent, at least one flocculation zone with at least one stirring means, capable of receiving a granular ballasting material denser than water such as micro-sand and at least one flocculent reagent, followed by a settlement zone with or without settlement lamellas, separating settled water extracted near the top and sludge that may either be sent directly to sludge treatment, or hydrocycloned to recycle the contents of granular material, if any, characterised in that it comprises means of measuring at least one item of information about the water and means to automatically enable:
  when the said at least one item of information about the water exceeds a certain threshold, a changeover to ballasted floc operating mode, the chemical coagulation—flocculation reagents being injected, water circulating in the flocculation zone, the ballasting material being put into suspension by the combined effect of the water velocity and the stirrers being started up at the appropriate speed, and being circulated in the flocculation after separation of settled sludges containing it by hydrocycloning;
  when the said at least one item of information, or combinations of different items, drops below a given threshold again, a changeover to operation without coagulation—flocculation reagents or floc ballasting, injection of reagents being stopped, the stirrers being stopped or put into operation at low operating speed, the granular material deposited at the bottom of the flocculation zone, the water to be treated passing in the flocculation zone at a velocity lower than the velocity at which the granular material is put back into suspension, or short circuiting the lower part of this zone in which the granular material is deposited, the sludge being directly extracted without hydrocycloning.

Preferably, the means provided are also capable of allowing an intermediate operating mode when the said information about the water is between two predetermined values, this operating mode comprising injection of a reagent without the use of any ballasting material, the reagents being injected, the stirrer(s) operating at low speed avoiding the granular material being put into suspension, and sludges being extracted to sludge treatment with or without prior hydrocycloning.

Also preferably, the flocculation zone is divided into a first injection zone provided with at least one disengagable stirring means in which the flocculent may be injected and the ballasting material may be recycled, and a second maturing zone provided with at least one disengageable stirring means in which additional flocculent and ballasting material can be injected, these two zones being separated by a separation partition provided with a lower opening enabling communication between them.

Advantageously, the installation comprises means of automatically enlarging the lower communication opening between the injection maturing zones, the said means being capable of reducing the water velocity between these two zones to below the resuspension velocity of the ballasting material used, when use of the ballasting material is not required.

Advantageously, the upper part of the separation partition of the injection and maturing zones may be automatically retracted, by a partition on jacks or an overflow weir, to bypass the lower part of these zones when the operating mode without reagent is required.

Also advantageously, the lower communication opening between the injection and maturing zones may be closed so as to store granular material in this compartment, when the use of granular material is not requested.

According to one preferred variant, the installation according to this invention comprises an automatic means of bypassing the flocculation zone when operation without reagents is requested.

Preferably, the said automatic means include:
  at least one flow or turbidity sensor, or a sensor to detect the concentration of a parameter characteristic of the treated water or the water to be treated;
  an automatic control comparing the signal received from the sensor(s) with predetermined thresholds controlling the changeover to one or the other of the operating modes provided, by stopping or starting the stirrer(s) in the flocculation zone at low or high speed, controlling stopping or starting of systems for the preparation and injection of chemical reagents and separation, recycling of the granular material or direct extraction of sludge, by opening or closing bypass means in the flocculation zone or reducing water velocities in the lower part of this zone.

This invention provides a means of making a single system combining the possibility of a physicochemical treatment with high velocity ballasted flocs under some conditions such as in rainy weather, with the possibility of a physicochemical treatment with reagent but without ballast, for example at dry weather peaks that could overload a downstream biological treatment, and with the possibility of a simple settlement treatment without the use of reagents or ballast, for example during average and low pollution in dry weather.

Basically, the invention consists of combining means of servocontrolling injection or non-injection of a reagent to thresholds of the water flow or pollution content to be treated, and means of avoiding the loss of granular ballast when the coagulation and/or injection of reagents are no longer injected, in a physicochemical water treatment system with ballasted floc using a granular ballast.

Figure 1B:
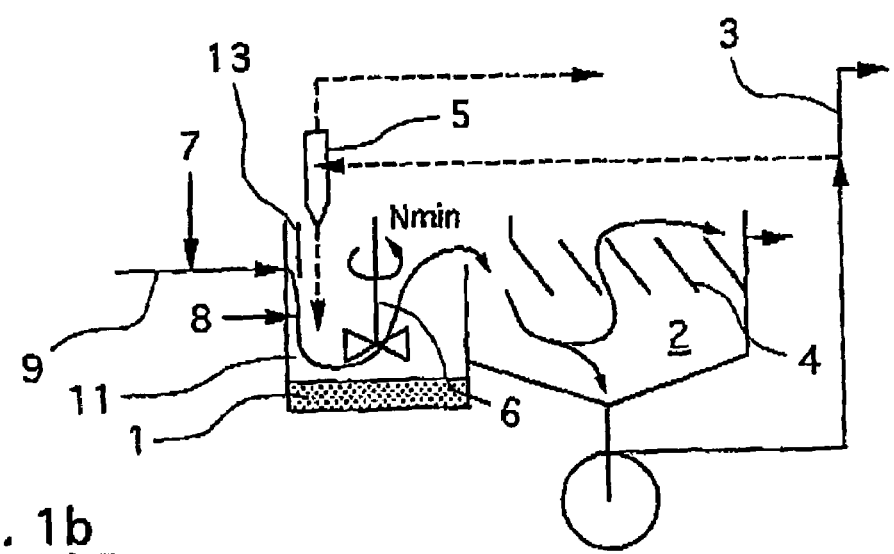
Figure 1C:
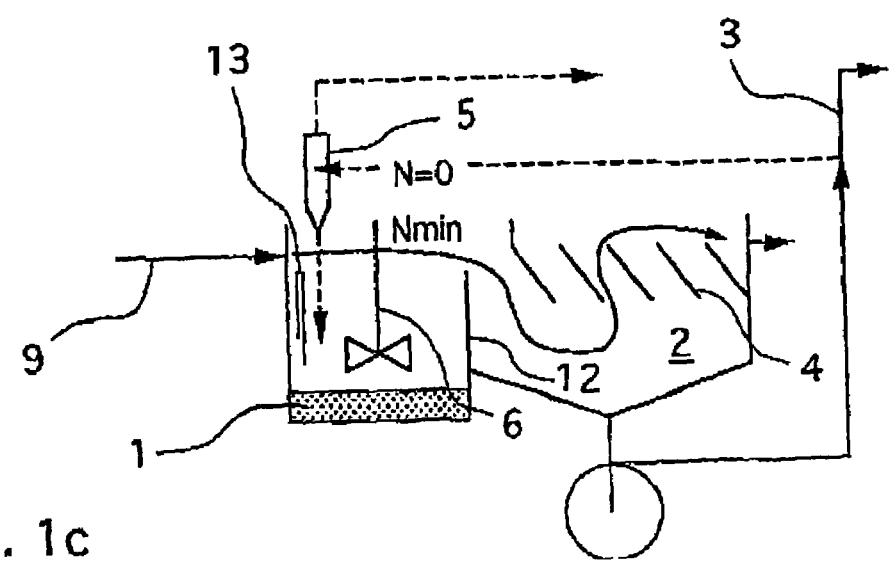

The invention and its advantages will be more easily understood after reading the following description of non-limitative examples of embodiments of the invention with reference to the attached drawings in which:

FIGS. 1a, 1b and 1c show a first example embodiment of three operating modes of the invention, namely:

ballasted settlement flocculation mode in FIG. 1a,
settlement flocculation mode without ballast and simple settlement mode without reagent in FIG. 1b,
simple settlement mode in FIG. 1c.

Figure 2A:
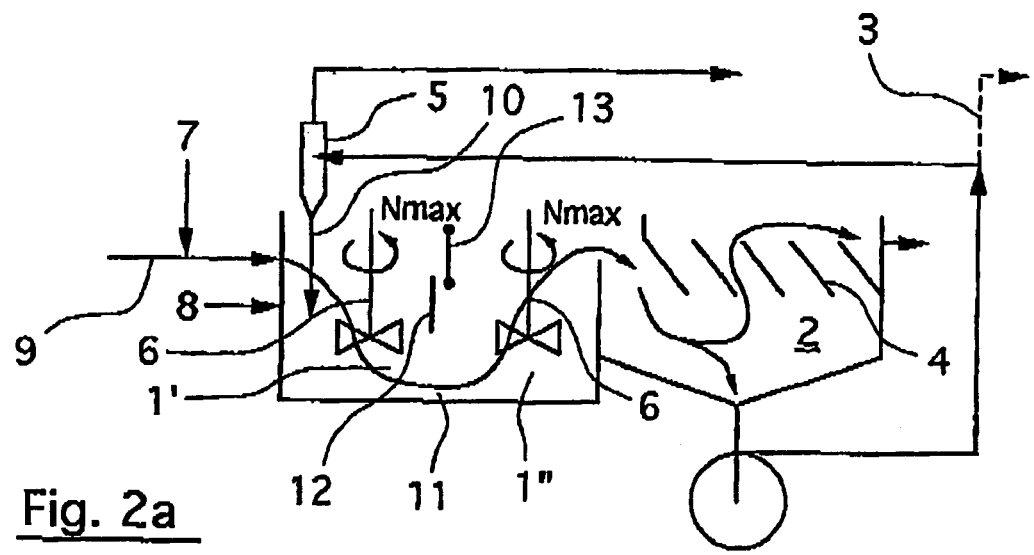
Figure 2B:
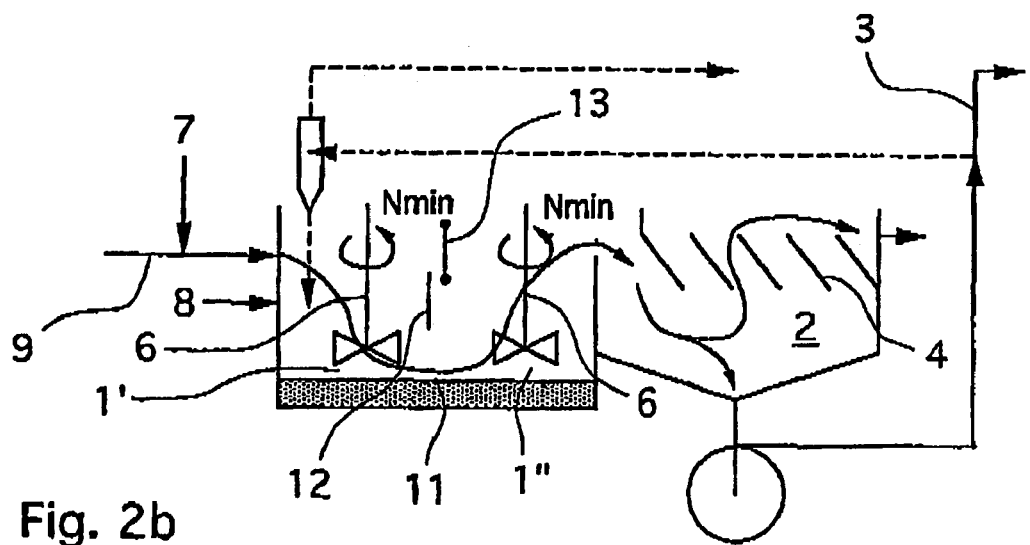
Figure 2C:
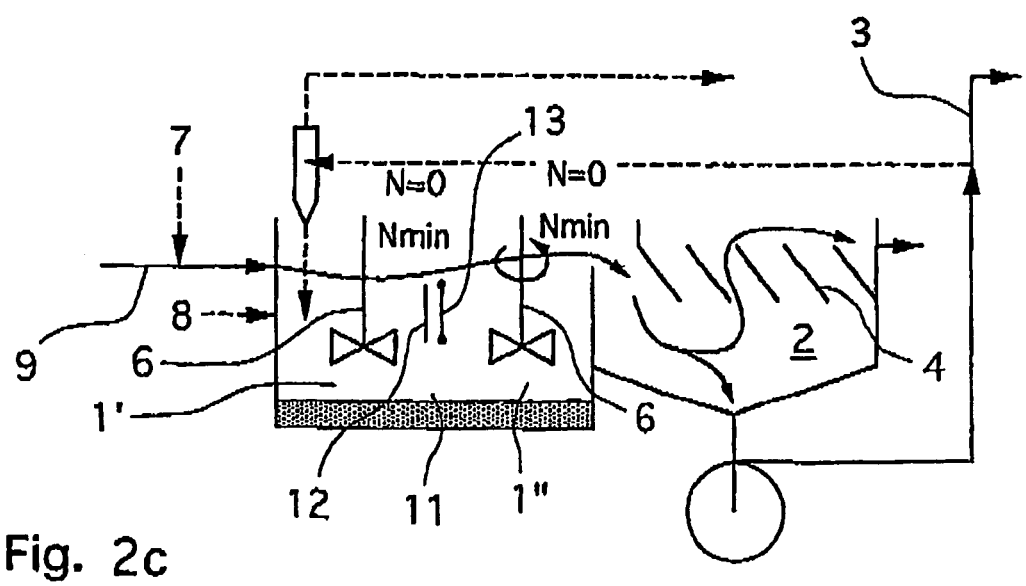

FIGS. 2a, 2b and 2c show a second example embodiment of the invention also with these three operating modes.

In these figures, the path followed by the water is indicated by the wavy arrows. N represents the operating speed of the aerators.

The installation shown with reference to FIGS. 1a, 1b and 1c is designed for treatment of raw water at a very variable flow or very variable pollution concentration, for example unit waste water for which the arrival flow varies by a ratio of an average of one during dry weather to a peak of two in dry weather, and to more than ten in rainy weather, or for example when surface water has to be made to made drinkable, if the turbidity is very variable, for example as a function of storm situations.

The installation comprises means of conveying the water to be treated 9, a coagulation zone on the input side of which a coagulation reagent 7 may be injected, an injection-maturing zone in which a flocculating reagent 8 and a ballast such as micro-sand may be injected. Coagulation and injection-maturing zones are made either in a single stirred basin 1 like that shown in FIGS. 1a, 1b and 1c, but preferably consist of two successive stirred basins 1', 1", like that shown in FIG. 2, an injection basin 1' possibly receiving the flocculation reagent and the micro-sand ballast, followed by a maturing basin 1" that can possibly receive additional flocculent.

A settlement zone 2, preferably provided with lamellas, is used to settle settlable materials that can be evacuated to the sludge storage or treatment area, or may be recycled on the input side, either directly to the injection zone or through a separation device 5 separating firstly the ballast returned to the injection zone, and secondly sludge evacuated to storage or treatment of sludge.

Stirring means 6 in the injection and maturing zones enable mixing flocculent reagent, sand and water at high speed, and keeping the ballasted flocs formed in suspension, in order to entrain them as far as the settlement zone.

When these stirring means 6 are operating at low speed, they allow the ballast to settle, while mixing reagents and water sufficiently to achieve flocculation and to keep the unballasted flocs formed in suspension.

Finally, the stirring means 6 can be stopped when the injection of chemical reagents is stopped, or they can be made to operate at very low speed to prevent depositions of materials in suspension in the injection-maturing zone, without bringing the ballast contained in the basin(s) back into suspension, or keeping it in suspension.

Means of measuring the flow and/or pollution content (not shown) are provided, in order to know the flows and/or pollution contents being treated or that will have to be continuously treated by the system.

Finally, the hydraulics of the system is designed to enable recirculation of micro-sand in the flocculation zone when the flow to be treated goes below a predetermined value, and to allow this micro-sand to deposit in this zone without any risk of it being entrained towards the downstream side settlement zone where it could be lost by overflow during operation without reagents. This can be achieved either by bypassing the tanks in which the micro-sand is stored, or by reducing the stirrer rotation speed to below the speed holding the sand in suspension, and possibly reducing the water velocity close to the surface of the deposited sand, or by any combination of these means.

We will now describe one possible type of operation of the system, given as an example:

Treatment of Waste Water from Unit Networks

In dry weather, which means weather during which the flow measured at the inlet is for example less than 1.5Q (where Q is the average dry weather flow in the waste water treatment unit), the injection of coagulant and flocculent reagents is stopped, and the flow is treated by simple settlement before being sent to the biological treatment following the described settlement unit.

Most of the micro-sand in the installation settles on the bottom of the injection zone, and the remainder settles at the bottom of the maturing zone.

The hydraulics of the water circulation is organised to prevent this sand from being put back into suspension, by any means known to an expert in the subject, for example like those described as examples in the figures, without being in any way limitative:

In FIGS. 1b and 2b, the rectangular opening 11 providing hydraulic communication with the flocculation basin 1' (FIG. 1b) or the maturing basin 1" (FIG. 2b) is sized so as to assure a scavenging velocity over the surface of the sand deposited at the bottom of the tanks much less than the resuspension velocity that depends on the type and diameter of the ballasting material used, and for 60 to 150 micrometer micro-sand will typically be less than 1 m/s and preferably less than 0.3 m/s, when the flow is less than the flow chosen for operation without micro-sand ballast. The height of this opening can be adjusted if required using a sliding partition that slides vertically under the control of jacks or worm screws, in order to reduce the velocity of the water above the sand.

In FIGS. 1c and 2c, the flocculation zone is bypassed, for example by opening an overflow weir 13 at the top of the partition supplying the flocculation zone in the case of FIG. 1c, or by opening an overflow weir at the top of the partition 12 separating the injection and maturing basins in the case in FIG. 2, or by transferring the flow into a lateral channel not shown.

In these various cases, the stirrers 6 may be put into operation at a sufficiently low speed to put organic materials in suspension, or to hold them in suspension, without bringing the micro sand into suspension or holding it in suspension, in order to limit risks of anaerobic fermentation at the bottom of the injection and maturing tanks. The surface velocities generated by stirring in this type of operation (pumping rate divided by the area of the tank) are then within the range 2.5 cm/second to 20 cm/second depending on the type of sand and the type of treatment (primary or tertiary waste water, drinking water), and typically between 5 and 10 cm/second.

For example, the settlement zone 2, of the lamellar type in the case described, may be designed to work at the mirror velocity (division of the flow to be treated by the area of the settlement zone) equal to a maximum of 25 m/h without reagents.

The sludge produced is then evacuated directly to sludge treatment 3 without necessarily passing through the hydrocyclone 5, since the sludge does not contain any micro-sand.

When the flow exceeds 1.5Q (25 m/h in settlement) while remaining less than 0.2Q, for example (33 m/h in settlement), in other words less than the flow in rainy weather, the scheme indicated in FIG. 1*b* or preferably in FIG. 2*b*, enables injection of the coagulant reagent 7 into the line on the upstream side of the injection basin or into a specific coagulation basin not shown on the diagram, and injection of the flocculent reagent 8, for example polymer, into the injection basin, by starting up injection pumps servocontrolled to thresholds of flows to be treated.

The overflow weir 13 that bypasses the injection and maturing basins through their upper part is raised so that these tanks can only communicate through their lower parts.

All injection and maturing basins then operate like a conventional flocculation tank with two successive zones and a residence time of the order of 15 minutes, and sufficient stirring to mix the water to be treated and the flocculation reagent, but without bringing much of the micro-sand back in suspension.

The treatment is then improved due to chemical flocculation of colloidal pollution, and the pollution content to be treated by biological treatment on the downstream side is kept to an acceptable level.

Also in this case, sludge extracted from the settlement zone may be sent directly to sludge treatment 3 (it can also be hydrocycloned at 5 if it is required to remove the small quantities of sand that may be located in it).

If the flow once again drops, for example, below 1.2Q (20 m/h in settlement), the reagent injection pumps 8 are stopped and the treatment once again becomes a simple settlement treatment conform with diagrams 1*c* or 2*c*, until the flow once again increases above the threshold of 1.5Q.

On the other hand, if the flow increases above 2Q (33 m/h) considered as storm weather difficult to treat by biological treatment, the speed of the stirrers 6 is increased up to the optimum selected for treatment by flocculation—ballasted settlement, the micro-sand is put back into suspension by the combined action of the increased flow and the increased stirring speed, hydrocycloning of the sludge and micro-sand is restarted to separate the sludge sent to sludge treatment, from sand recycled to the injection zone, and everything operates like a flocculator settlement tank with ballasted floc, with settlement velocities of up to 200 m/h, in other words flows of the order of 12Q, and residence times in injection—maturing dropping to 2.5 minutes compatible with this type of treatment.

The flow of treated water that can be accepted in the biological treatment is then sent to biological treatment, and the remainder of the flow is sent to the receiving medium.

When the flow once again drops below 1.8Q, for example, the system returns to the operating mode without micro-sand (drop in the speed of stirrers, all micro-sand is returned to the injection tank and hydrocycloning of the sludge is then stopped, and then if the flow drops even further, reagent injection is stopped and the injection and maturing tanks bypass can be stopped.

Pollution concentration sensors, or turbidity meters, for example coupled to the flow measurement, can help an expert in the subject to refine the automatic changeover from one type of operation to the other depending on the variation of total pollution contents to be treated.

Treatment of Water with High Turbidity Variations to Make it Drinkable:

Some water, like karstic water, may have a very low turbidity of a few NTU under normal conditions so that it can be treated directly by filtration, but it may suddenly become very turbid (for example more than 100 or more than 1000 NTU), making a flocculation settlement treatment necessary prior to filtration.

Sand ballasted flocculation settlement is suitable for this scenario, because it can be started very quickly within a few minutes, but it will be useful to install a system enabling operation in direct filtration during low turbidity periods to minimise unnecessary reagent consumptions.

In this case, a turbidity meter could be used to control the changeover of the system from operation in direct filtration (with or without short circuit of the injection and maturing tanks, storage of sand at the bottom of these tanks, stirrers stopped or at low speed, reagent injection stopped, sludge recirculation and hydrocycloning circuits stopped) to operation in ballasted flocculation settlement (hydrocycloning of the sludge and sand restarted, normal operation of injection and maturing tanks in series, coagulant and flocculent reagents injected, stirrers in operation at full speed holding the sand and flocs in suspension or bringing them back into suspension) during turbid periods, and return to direct filtration when the turbidity is low enough for this type of operation to be suitable once again.

These examples are simply a demonstration of the advantage of the more general method described above to adapt operation of the same system in simple settlement without reagents to operation in ballasted settlement with reagents, possibly passing through operation in conventional physicochemical flocculation settlement with reagent but without ballast, as a function of hydraulic flows and incoming pollution and/or quantities of water to be treated or that has been treated.

What is claimed is:

1. A method of treating water comprising at least three different operation modes including a first mode of treating the water with a ballasted flocculation process and including injecting into the water granular ballasting material denser than the water, a coagulant, and a flocculant to yield treated water, separating flocs from the treated water by a gravity separation step and separating granular material from the flocs leaving sludge that is directed to a sludge treatment process; changing modes of operation by changing from the ballasted flocculation process to a second mode where contaminants in the water are separated by a gravity separation process without the use of coagulation and flocculation reagents; and changing modes of operation from the second mode to a third mode wherein the water is treated with at least a chemical coagulation or flocculation reagent, but without granular ballasting material; the changeover from one operating mode to another being determined based on at least one item of information related to the water at any step in the method of treatment and before the treatment.

2. Method according to claim 1, characterized in that the said granular ballasting material is micro-sand with an effective diameter of between 30 and 200 micrometers, and in which said gravity separation step is a settlement step.

3. Method according to claim 1, characterized in that the granular material is micro-sand with an effective diameter of between 30 and 200 micrometers, and the said gravity separation step is a centrifuging step.

4. Method according to claim 1, wherein at least one item of information about the water used to decide which operating mode should be used is chosen from among the water flow to be treated, turbidity of the water to be treated, turbidity of the treated water, Chemical Oxygen Demand (COD) of the water to be treated, Total Organic Carbon (T.O.C.), and resistivity.

5. Method according to claim 1, including using low speed stirrers to avoid bringing granular ballasting material back into suspension in the first mode wherein the speed is between 2.5 and 20 centimeters per second.

6. Method according to claim 5, wherein the speed of the stirrers used to avoid bringing granular ballasting material back into suspension in the first mode is between 5 and 10 centimeters per second.

7. Method according to claim 1, wherein the changeover changing from one operating mode to another is automatic.

* * * * *